…

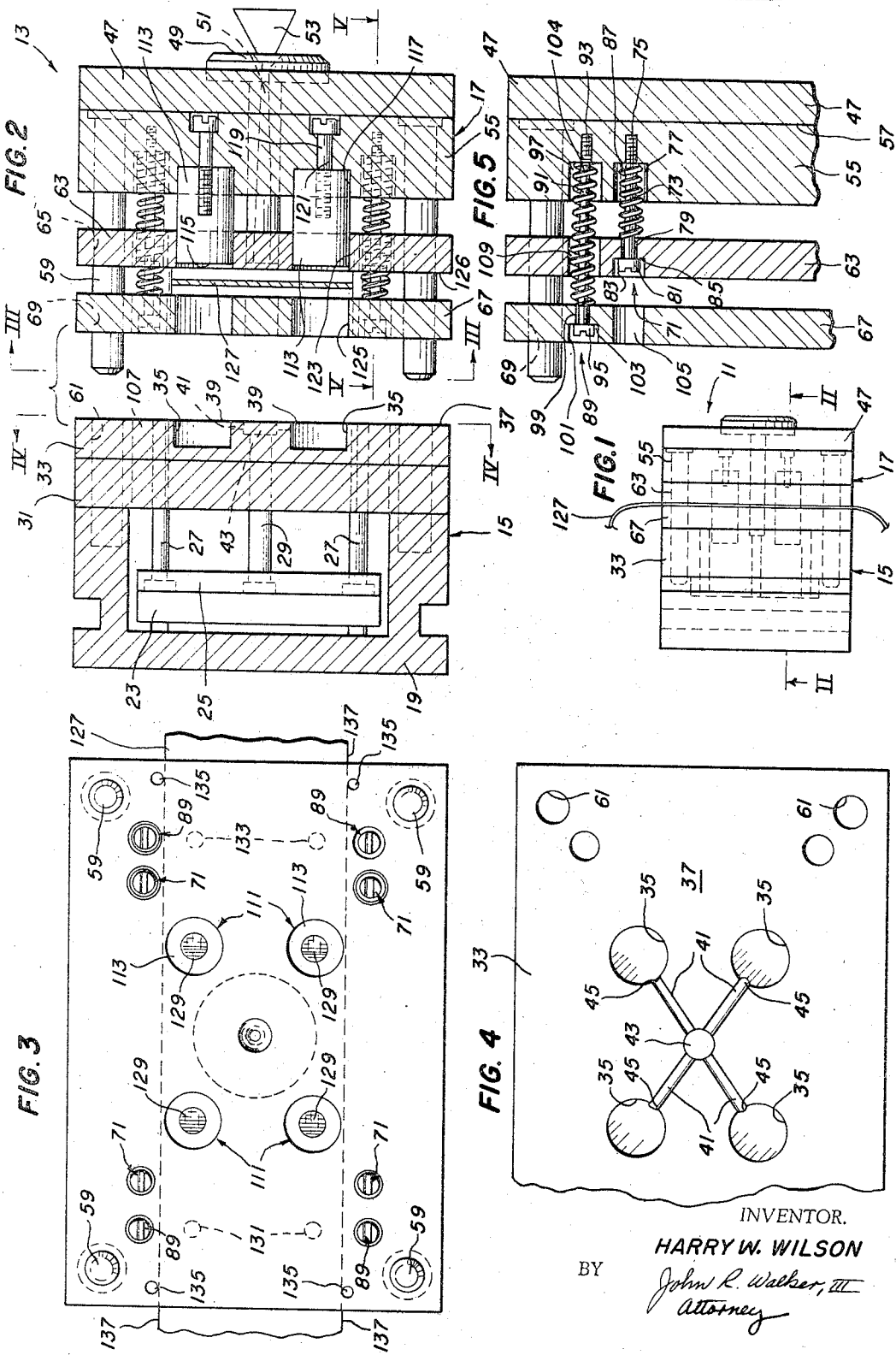
Feb. 18, 1969  H. W. WILSON  3,427,688
MEANS FOR PRODUCING AN ILLUSTRATED MOLDED PRODUCT
Filed Nov. 25, 1966  Sheet 1 of 2
INVENTOR.
HARRY W. WILSON
BY John R. Walker, III
Attorney

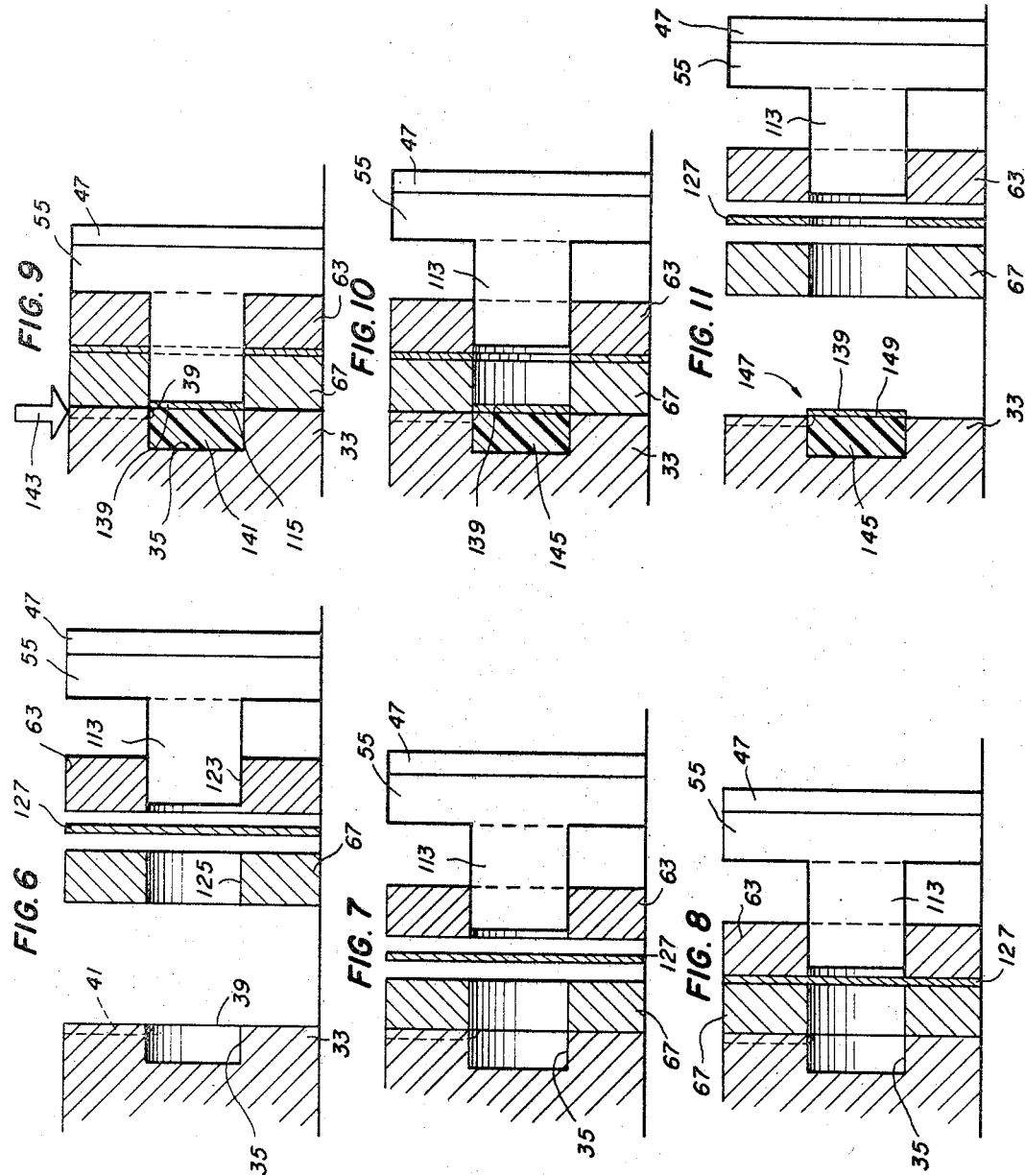

United States Patent Office 3,427,688
Patented Feb. 18, 1969

3,427,688
MEANS FOR PRODUCING AN ILLUSTRATED
MOLDED PRODUCT
Harry W. Wilson, Rte. 2, Magazine, Ark. 72943
Filed Nov. 25, 1966, Ser. No. 597,007
U.S. Cl. 18—36     5 Claims
Int. Cl. B32b 31/30; B29d 31/00; B29c 1/02

This invention relates to means for producing an illustrated molded product.

Heretofore, in producing plastic molded products or items, such as molded plastic toys, dolls, novelties, and other high production molded plastic items, as far as color was concerned, the producer was generally limited to a single color. For example, in producing a molded plastic figure as a doll, it was all in one color of plastic and if other colors were desired for the facial features, etc., it was necessary to put them on by some slow process as painting. This was disadvantageous and resulted in a product that was relatively expensive and still did not have fine detail.

The present invention is directed towards overcoming the above-mentioned and other disadvantages in producing molded plastic items by providing a machine which produces an illustrated molded item that is an exact duplication of the original illustration by the artist.

A further object is to provide such a machine for producing molded plastic items which may be of multiple colors.

A further object is to provide such a machine which is substantially automatic and which can produce high quality illustrated molded items at a high production rate and relatively inexpensively.

The means by which the foregoing and other objects present invention are accomplished and the manner of their accomplishment will be readily understood from the following specification upon reference to the accompanying drawings, in which:

FIG. 1 is a partially sectionalized elevational view of the machine of the present invention.

FIG. 2 is an enlarged sectional view taken as on the line II—II of FIG. 1.

FIG. 3 is a view taken as on the line III—III of FIG. 2.

FIG. 4 is a fragmentary view taken as on the line IV—IV of FIG. 2.

FIG. 5 is a fragmentary sectional view taken as on the line V—V of FIG. 2.

FIGS. 6–11 are schematic views showing the various positions during the operation of the machine of the present invention.

Referring now to the drawings in which the various parts are indicated by numerals, the machine 11 of the present inventon includes a mold means or mold assembly 13 that is of a general type known as an injection mold. Mold assembly 13 includes two general parts, namely, a first or relatively movable part 15 and a second, or stationary part 17. Movable part 15 is movably mounted by suitable well-known means, not shown, to move the mold assembly 13 between an open mold position best seen in FIGS. 2 and 6 to a closed mold position, best seen in FIGS. 1 and 9.

Movable part 15 includes the usual ejector housing 19 which is supported by suitable well-known means. In ejector housing 19 is provided the usual ejector plate 23, ejector retainer plate 25, return pins 27, and sprue puller 29, all of which function in the usual manner well-known to those skilled in the art. The usual support plate 31 is fixedly attached to ejector housing 19, and a cavity plate 33 is mounted on support plate 31. Cavity plate 33 is provided with the desired number of cavities 35 in the face 37 thereof. In the drawings four of such cavities 35 are shown for illustration purposes, although more or less may be provided without departing from the spirit and scope of the present invention. Each of cavities 35 open through the face 37 and establish a mouth 39 of the cavity adjacent face 37. In the drawings the cavities 35 have been shown as being cylindrical, although other desired shapes may be provided. In addition, for purposes of illustration only, the cavities 35 are shown formed in the main body of the cavity plate 33, but if desired, the cavities per se may be formed by having inserts of heat resistant materials in the main body of the cavity plate. The usual runners 41 are provided in face 37 and lead from the central depression 43 provided in the face to the respective cavities 35. Also, the usual gates 45 are provided between the runners 41 and the cavities 35.

Part 17 is provided with the usual clamping plate 47 and sprue bushing 49 including the related parts whereby molten plastic is introduced in the usual manner (when mold assembly 13 is closed) through the channel 51 as by means of the nozzle and source of molten plastic which is indicated diagrammatically as at 53. An A plate 55 is fixedly mounted on the face 57 of clamping plate 47. A plurality of locating pins 59 are fixedly attached to A plate 55 in the usual manner and are adapted to project into locating sockets 61 provided in cavity plate 33, support plate 31 and ejector housing 19.

The heretofore-described parts of machine 11 represent the generally old portions of the machine 11 well-known to those skilled in the art and which function in a well-known manner. The following description, on the other hand, discloses the new portions of the machine 11, their unique relationship to each other and to the heretofore-described old parts of the machine. A stripper plate 63 is movably mounted relative to clamping plate 47 and A plate 55 with the locating pins 59 slidably respectively extending through bores 65 in stripper plate 63. A die plate 67 is movably mounted relative to clamping plate 47, A plate 55, and stripper plate 63 with locating pins 59 slidably respectively extending through bores 69 in the die plate. The stripper plate 63 and die plate 67 are disposed between A plate 55 and cavity plate 33 with the stripper plate 63 being adjacent the A plate and die plate 67 being adjacent the cavity plate. When mold assembly 13 is in said closed position, the stripper plate 63 and die plate 67 are clamped between A plate 55 and cavity plate 33, as seen in FIG. 1, and when the mold assembly is in an open position, the stripper plate 63 and die plate 67 are respectively spaced from cavity plate 33 and A plate 55 and from each other, as best seen in FIG. 2.

Spring means are provided for urging stripper plate 63 and die plate 67 into the above-mentioned spaced relationship relative to A plate 55 and relative to each other. Thus, a plurality of resilient assemblies 71 react between A plate 55 and stripper plate 63. The resilient assemblies 71 are identical, and the following description of one will suffice for all. Each resilient assembly 71 comprises a bolt 73 having a threaded portion 75 at one end threadedly engaged into a threaded socket in A plate 55. Bolt 73 extends from threaded portion 75 through an enlarged socket 77 in A plate 55 and slidably through a bore 79 in stripper plate 63 and thence terminates in a head 81. A socket 83, in stripper plate 63 is adapted to receive head 81 when the mold assembly 13 is in an open position. An annular shoulder 85 defines the bottom of socket 83 and provides stop means which engages head 81 to limit separating movement of stripper plate 63 relative to A plate 55. A spring 87 is disposed around bolt 73 between A plate 55 and stripper plate 63 to urge the stripper plate into separating movement relative to the A plate when the mold assembly is in an open position. Likewise, resilient assemblies 89 which are similar to resilient assemblies 71 are provided between die plate 67 and A plate 55. Thus, each resilient assembly includes a bolt 91, threaded portion 93 and head 95 which correspond to bolt 73, threaded portion 75 and head 81. Also, A plate 55 is provided with an enlarged socket 97 corresponding to enlarged socket 77 and die plate 67 is provided with a bore 99, socket 101 and shoulder 103 which correspond to bore 79, socket 83, and shoulder 85. Additionally, a spring 104, which corresponds to spring 87, is provided around bolt 91 between A plate 55 and die plate 67 to urge the die plate outwardly away from the A plate. Die plate 67 is provided with a bore 105 to give head 81 room to move when the mold assembly 13 is closed. Likewise, cavity plate 33 is provided with a bore 107 for head 95 to move. In addition, a bore 109 is provided in stripper plate 63 through which bolt 91 and spring 104 extend.

A plurality of punch means or punch assemblies 111 which correspond in number to cavities 35 are mounted on A plate 55. The punch assemblies 111 are substantially alike and the following description of one will suffice for all. Each of punch assemblies 111 comprises a punch 113 having an end 115. Punch 113 is of the same cross sectional shape as cavity 35, and therefore in the example given is circular in cross section and is cylindrical in overall shape. Punch 113 is anchored in a socket 117 in A plate 55 as by means of a bolt 119 extending through a bore 121 in the A plate and threadedly engaged in the end of punch 113 opposite from end 115. For each cavity 35 and corresponding punch 113 there is provided an aperture 123 in stripper plate 63 and an opening 125 in die plate 67, which are in alignment with each other and with cavity 35 and punch 113. Aperture 123 and opening 125 are of the same cross sectional shape as punch 113 and cavity 35, and thus in the illustration given are circular and of the same size as the punch and the cavity. For purposes of illustration the aperture 123 and opening 125 are shown formed respectively in the main bodies of the stripper plate 63 and die plate 67, but if desired, the aperture per se and opening per se may be formed by having inserts of some other material in the main bodies of the stripper and die plates. Punch 113 is slidably received in aperture 123 and when the mold assembly 13 is moved into said open position, the end 115 of punch 113 is retracted into aperture 123, as best seen in FIG. 2, with end 115 being inwardly of face 126 of the stripper plate 63 so that the stripper plate is effective to strip the sheet of material 127 from the punch 113, as will be better understood in the description to follow later in the specification in which the function of sheet of material 127 is more fully explained.

Sheet 127 is of any suitable material, as for example, paper upon which is printed illustrations, as illustrations 129, that are depicted in any desired form and color, as the design shown in FIG. 3, and are adapted to respectively be aligned with die openings 125 and end 115 of punch 113. This alignment may be by any suitable means, as for example, it may be done manually or by a pair of punches 131 carried by stripper plate 63 and a pair of pins 133 also carried by stripper plate 63. Thus, with the use of punches 131 and pins 133, the sheet of material 127 is first positioned so that the illustrations 129 align with openings 125 and ends 115, the mold assembly 13 is closed to cause a pair of holes, not shown, to be punched by punches 131 and then these holes are moved over pins 133, which will cause the next set of illustrations 129, that are printed in groups along the sheet of material, to be aligned properly with the ends 115 and openings 125. In other words, the machine 11 operates in a cycle wherein the mold assembly 13 is closed, is then opened, the sheet of material 127 is moved to bring the next group of illustrations 129 into alignment with opening 125 and ends 115, the mold assembly is closed again, etc. Stated another way, the sheet of material 127 is moved alternately with the closing of the mold, by suitable means, not shown, and as for example, to the right as viewed in FIG. 3. There are guide pins 135 which slidably contact the opposite edges 137 of sheet of material 127 for the positioning thereof insofar as the shorter dimension of die plate 67 is concerned. As heretofore stated, the positioning of sheet material 127 relative to the longitudinal dimension of the die plate is done by suitable means or manually.

In describing the primary operation of the machine 11 of the present invention, particular reference is directed to FIGS. 6–11 which show schematically the operation of one of the punches 113 with the corresponding cavity 35, opening 125 and aperture 123. It is assumed for the purposes of describing this operation that the parts are first in the position shown in FIG. 6 wherein the mold assembly is shown in an open position. Cavity plate 33 with the other portions of movable part 15 move to the right whereupon cavity plate 33 contacts die plate 67, as shown in FIG. 7. Continued movement to the right of cavity plate 33 causes die plate 67 to move therewith and causes the sheet of material to be forced against stripper plate 63 by die plate 67, as best seen in FIG. 8. Also, the springs 104 are caused to be compressed. Continued movement of cavity plate 33 and die plate 67 causes sheet of material 127 to move against end 115 and in cooperation with die plate 67 a piece 139 of sheet of material 127 is caused to be cut out, which piece has the same shape as the cross sectional shape of the punch 113 and die opening 125. This piece 139 has an illustration 129 thereon since the illustration is in alignment with the die opening 125, and piece 139 is held by the end 115 as cavity plate 33, die plate 67, and stripper plate 63 move to the right so that piece 139 is disposed adjacent the mouth 39 of cavity 35, as best seen in FIG. 9. This also causes compression of springs 87. In this position shown in FIG. 9 the mold assembly 13 is completely closed and end 115 forms a closure for the cavity 35. It will be noted that the end 115 is retracted in opening 125 a slight amount preferably the thickness of piece 139. With the mold assembly 13 in this closed position the molten plastic 141 is introduced from the source shown diagrammatically by the arrow 143. It will be understood that this molten plastic is introduced from nozzle 53 through channel 51, central depression 43, runners 41, and gates 45 into the cavity 35. The molten plastic 141 permeates into the pores of the piece 139 so that the piece is actually embedded in the plastic when the plastic hardens. After the plastic hardens sufficiently (the hardened plastic being indicated as at 145) the mold assembly 13 is opened, that is, the cavity plate is moved to the left as shown in FIG. 10 and this continues until the mold assembly is in the completely open position shown in FIG. 11. Thus, the finished product 147 remains and is ejected from the cavity 35 in a manner well-known to those skilled in the art. The finished product or illustrated plastic molded item 147 comprises the body of hardened plastic 145 and the illustrated piece of material 139 embedded in the plastic on a face 149 of the hardened plastic 145.

From the foregoing, it will be seen that a machine is provided which can produce at a high production rate illustrated plastic items that may have any detail and any colors that are desired. In other words, the greatest detail may be provided in the illustration and which is an exact duplication of the original drawing by the artist.

Although the invention has been described and illustrated with respect to a preferred embodiment thereof, it is to be understood that it is not to be so limited since changes and modifications may be made therein which are within the full intended scope of this invention as hereinafter claimed.

I claim:

1. Means for producing an illustrated plastic molded item comprising a sheet of material having an illustration thereon; mold means movable between an open position and a closed position, said mold means including cavity means providing at least one cavity for the reception of molten plastic, said cavity having a mouth, die plate means providing a die opening in alignment with said cavity, said sheet of materal being disposed adjacent said die means on the remote side thereof from said cavity, punch means having an end for cooperation with said die plate means during movement of said mold means from said open position to said closed position to cut an illustrated piece from said sheet of material and for moving said piece into a position adjacent the mouth of said cavity when said mold is moved into said closed position, said end of said punch establishing a closure for said cavity when said mold is in said closed position, means for introducing molten plastic into said cavity when said mold means is in said closed position for forming the body of said item out of said plastic with said illustrated piece being embedded in said body.

2. The machine of claim 1 in which is included means for aligning said sheet material with said die plate means and said punch means.

3. The machine of claim 1 in which is included stripper plate means adjacent said punch for stripping said sheet of material from said punch when said mold means is moved from a closed position to an open position.

4. The machine of claim 3 in which said stripper plate means includes a plate having a face adjacent said sheet of material and having an aperture in said plate which slidably receives said punch means, said end of said punch means when said mold means is in an open position being retracted in said aperture with said end being inwardly of said face of said plate and in which is included means urging said stripper plate means outwardly relative to said punch end when said mold means is moved from a closed position into an open position.

5. A machine for producing an illustrated plastic molded item out of a sheet of material having an illustration thereon; said machine comprising mold means movable between an open position and a closed position, said mold means including a cavity plate provided with at least one cavity therein and said cavity having a mouth, means supporting said cavity plate, a clamping plate, an A plate supported by said clamping plate, a die plate and a stripper plate disposed between said cavity plate and said A plate, said die plate being provided with at least one opening in alignment with said cavity, means movably mounting said die plate and said stripper plate from said clamping plate for movement between a clamped position in which said die plate and said stripper plate are clamped between said cavity plate and said A plate when said mold means is closed and a spaced position in which die plate and said stripper plate are spaced from each other and said cavity plate and said A plate when said mold means is in an open position, spring means urging said die plate and said stripper plate into said spaced position when said mold means is in an open position, punch means including at least one punch having an end for cooperation with said die means during movement of said mold means from said open to said closed position to cut an illustrated piece from said sheet of material and for moving said piece into a position adjacent the mouth of said cavity when said mold is in said closed position, said end of said punch establishing a closure for said cavity when said mold is in said closed position, means for introducing molten plastic in said cavity when said mold means is closed for forming the body of the item out of said molten plastic with said illustrated piece being embedded in said body on one face thereof, said stripper plate having a face adjacent said sheet of material and having an aperture therein slidably receiving said punch, said end of said punch when said mold means is in an open position being retracted in said aperture in said stripper plate with said end being inwardly of said face of said plate.

References Cited
UNITED STATES PATENTS

| | | | |
|---|---|---|---|
| 2,357,950 | 9/1944 | Goessling | 18—36 X |
| 2,377,128 | 5/1945 | Burgess | 18—36 |
| 2,560,024 | 7/1951 | Brown. | |
| 2,657,426 | 11/1953 | Gora. | |
| 2,745,135 | 5/1956 | Gora. | |
| 2,903,388 | 9/1959 | Jonke et al. | |
| 2,952,035 | 9/1960 | Gora. | |
| 3,077,003 | 2/1963 | Hobson | 18—36 |
| 3,150,220 | 9/1964 | Howell | 249—83 |

J. HOWARD FLINT, JR., *Primary Examiner.*

U.S. Cl. X.R.

18—42; 249—83